Patented Sept. 24, 1935

2,015,252

UNITED STATES PATENT OFFICE 2,015,252

COATING

Edmond H. Bucy, Waukegan, Ill., assignor, by mesne assignments, to Atlas Powder Company, Wolf Lake, Ill., a corporation of Delaware No Drawing. Application June 6, 1932, Serial No. 615,765

10 Claims. (Cl. 106—37)

This invention relates to coatings, and more particularly to novel compositions of matter for forming coatings applicable to plastic finishes, walls, architectural finishes, oil paintings and the like.

The present invention is a continuation in part of my copending application, Serial No. 610,707, filed May 11, 1932, and is directed to a method of drying and pulverizing the coating produced by the method outlined in my prior application, and the formation of the dried and pulverized material into plastic masses.

These plastic materials may be used for forming work or for moulding operations, or may be made into dry powder, which powder may then be suspended in any suitable vehicle or menstruum for application, as a finish, either by brushing or spraying. The dried powder may be merely mixed with the vehicle or may be ground into the vehicle or menstruum by any of the well known methods.

In the preferred embodiment of the invention, I first prepare a coating formed, in the main, of an emulsion of casein and nitrocellulose. These two materials are first incorporated in suitable solvents, and the solvents are then carefully mixed to produce the final composition. Various constituents may be admixed into the solutions to give certain characteristics of durability, distensibility and adhesiveness to the coating. The preparation and constituents used are described in detail in my copending application, and need not be repeated here. Suffice it to say, this coating is formed by dissolving nitrocellulose, with or without desired resins, plasticizers or pigments, in a solution of acetic acid derivatives, alcohol, or both, to which may be added certain fatty acid derivatives, if desired. Casein or the equivalent adhesive material is then separately dissolved in an aqueous alkaline solution, the two solutions are then carefully mixed to form an emulsion. Since casein is substantially insoluble in alcohols, ethers, or water, the mixing of the two solutions in proper proportions produces a true suspension or emulsion which, when applied to a surface, produces a coating having the desired characteristics of durability, distensibility and adhesiveness.

The coatings produced in this manner have relatively quick-drying properties, and may be dried readily by any suitable mechanical means. The pulverizing or grinding of the emulsion may occur during the drying operation, or after the emulsion has been dried, and the resultant materials may then be made up into plastic masses, for use in moulding work and for forming.

I have found that suitable plasticizers for preparing the dried and pulverized materials for use in coatings and finishes are those of the solvent softening type, such as dibutyl or diethyl phthalate, or tricresyl phosphate. When the dried and pulverized materials are suspended in or admixed with this type of plasticizer, the resultant mass is peculiarly adapted for use as a coating or finish for work of the character described.

Treated oils may also be used as plasticizers, for example, blown or sulphated castor oil, oxidized linseed oil, or blown rape seed oil, and these are equally effective. Raw castor oil and raw linseed oil may also be used. Resins of various types can be used, such as semi-liquid glycerol phthalate resin, or the like, to produce a plastic mass possessing characteristics which make it useful for the above mentioned operations. Other resins which might be incorporated are alcoholic stearates and metallic stearates, such as butyl stearate and zinc or aluminum stearate. These resins are added to assist in imparting proper flowing characteristics to the material.

For stabilizing the plastic materials formed from the dried and pulverized emulsions, I preferably add zinc oxide, or substances of similar characteristics.

If desired, the dried and pulverized material formed from the emulsion coating may be made into dry powder, or may be suspended in a lacquer, varnish or similar vehicle. Some vehicles of this type are the oleo-resinous or varnish vehicles, nitro-cellulose or similar emulsion vehicles, or a straight water menstruum may be used. Combinations of these vehicles may also be used, if desired, for producing certain desirable characteristics in the finished emulsion or coating.

The properly pulverized and dried emulsion may be incorporated in a suitable vehicle, by merely mixing the powder with the vehicle, such as by stirring or the like, or it might be ground into the vehicle in any of the well-known methods of mixing, for example, in the same manner that a pigment is ground into a paint vehicle.

While I have described a method of preparing a dry powder, produced from an emulsion coating, for use either in forming and moulding operations, or as a finish, adapted to be properly mixed with a lacquer or varnish vehicle, or a suitable menstruum, I do not intend to be limited to the details described, nor to the materials or constituents employed, except as defined by the spirit and scope of the appended claims.

I claim:

1. The method of forming a plastic mass for moulding work from an emulsion coating composition of nitrocellulose and an alkaline solution of casein which comprises drying said composition, pulverizing said composition, and treating said composition with a solvent plasticizer for nitrocellulose.

2. The method of forming a plastic mass for moulding and forming purposes from an emulsion of nitrocellulose and an alkaline solution of casein which comprises drying and pulverizing said emulsion mechanically, and admixing with said dried and pulverized emulsion a phthalate forming a solvent softening material.

3. The method of forming a plastic mass for moulding purposes which comprises drying and pulverizing an emulsion comprising a solution of nitrocellulose, acetic acid and a resin, and a solution of casein in ammonia, and adding to said dried and pulverized emulsion a solvent plasticizer for nitrocellulose.

4. The method of forming a plastic mass for moulding purposes which comprises drying an emulsion coating composition including a nitrocellulose varnish solution and an alkaline solution of casein, pulverizing said emulsion, adding a resinous solvent softening material to said dried and pulverized emulsion, and admixing a stabilizing constituent comprising zinc oxide into said mass.

5. The method of preparing a coating composition from dry powder which comprises drying an emulsion coating composition of nitrocellulose and an alkaline solution of casein, pulverizing said dried emulsion to form a fine powder, and mixing said pulverized powder with a varnish vehicle.

6. The method of preparing a coating which comprises drying an emulsion of nitrocellulose and a basic solution of casein, pulverizing said dried emulsion into a fine powder, and grinding said powder into a varnish vehicle.

7. The method of preparing a coating which comprises drying an emulsion of a solution of nitrocellulose and acetic acid, and a basic solution of casein, pulverizing said dried emulsion into a fine powder, and grinding said powder into an oleo-resinous vehicle.

8. The method of forming a composition of matter for moulding and finishing operations which comprises drying an emulsion comprising a mixed solution of nitrocellulose and a basic solution of casein, pulverizing said dried emulsion into a fine powder, adding to said powder a solvent plasticizer for nitrocellulose and incorporating said powder and material in an oleo-resinous vehicle.

9. The method of forming a plastic mass for moulding purposes which comprises drying a coating composition of nitrocellulose and casein, pulverizing said dried composition, and treating said dried and pulverized composition with a solvent plasticizer for nitrocellulose.

10. The method of forming a composition of matter for moulding and finishing operations which comprises drying an emulsion comprising a mixed solution of nitrocellulose and a basic solution of casein, pulverizing said dried emulsion into a fine powder, and incorporating said powder in a plasticizer consisting of one of the following group; raw castor oil, raw linseed oil, treated castor oil, treated linseed oil, and blown rape seed oil.

EDMOND H. BUCY.